Jan. 14, 1947.                C. E. KRAUS                2,414,231
                    CUTTING TOOL AND TIP THEREFOR
                       Filed Sept. 11, 1944

INVENTOR
Charles E. Kraus
By Carlson, Pitzner, Hubbard & Wolfe
ATTORNEYS

Patented Jan. 14, 1947

2,414,231

UNITED STATES PATENT OFFICE 2,414,231

CUTTING TOOL AND TIP THEREFOR

Charles E. Kraus, Rochester, N. Y.

Application September 11, 1944, Serial No. 553,485

3 Claims. (Cl. 29—95)

This invention relates to the tips of metal cutting tools, particularly those composed of material having the property known as red hardness, that is to say, the ability to permanently retain a hardness ample for metal cutting even after heating of the material above bright redness or substantially in excess of 1200 degrees Fahrenheit.

There are two groups of metal cutting materials of this character now available. One of these is sintered carbide such as the material sold under the trade names of Carboloy, Firthite, Kennametal, and Rexite and comprising particles of the carbide of one or more metals such as tungsten, tantalum, and titanium bonded together by a metal, such as cobalt, having a very high melting point. The other group of cutting material includes those sold under the trade names of Stellite, Rexaloy, Tantung, or Crobalt and comprising cast alloys of nonferrous metals including tungsten, cobalt, chromium, tantalum, and others. The carbide materials possess greater red hardness than the cast materials, that is to say, at any given operating temperature, tungsten carbide is harder than Stellite and, for this reason, is preferred as a cutting material. Such carbides are, however, more difficult to sharpen by grinding because their hardness approaches that of grinding abrasives. Because of this, higher temperatures are produced frictionally during the grinding of carbide tips, frequently resulting in cracking and checking. This difficulty is not nearly as serious in the case of the cast cutting materials owing to their substantially lesser hardness.

I take advantage of these inherent characteristics of the two groups of materials to produce a composite cutting tip which utilizes all of the advantages of the sintered carbide as a cutting material while greatly facilitating grinding.

A more detailed object is to provide a composite cutting tip comprising a relatively thin layer of sintered carbide as the cutting material and a substantially thicker layer composed of material of inherent red hardness but of the cast type mentioned above and utilized, not as a cutting material, but as a support or carrier of the carbide layer.

Other objects and advantages of the invention will become apparent from the following detailed description taken in connection with the accompanying drawing, in which Figure 1 is a perspective view of a milling cutter tooth embodying the present invention.

Figure 1:
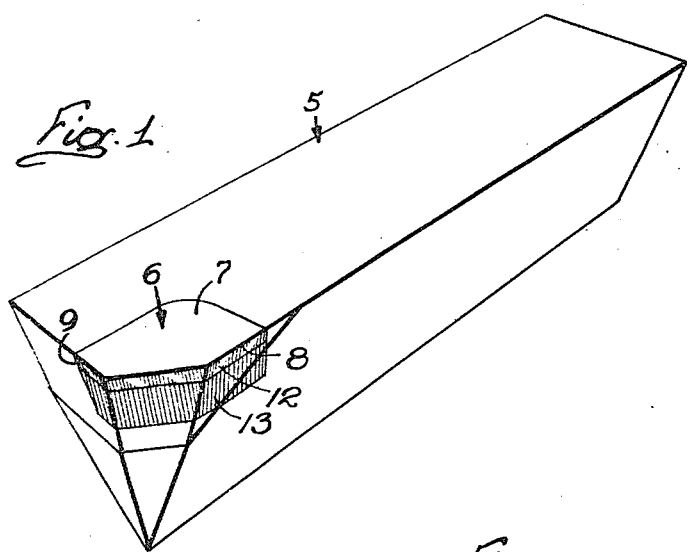
Figure 2:
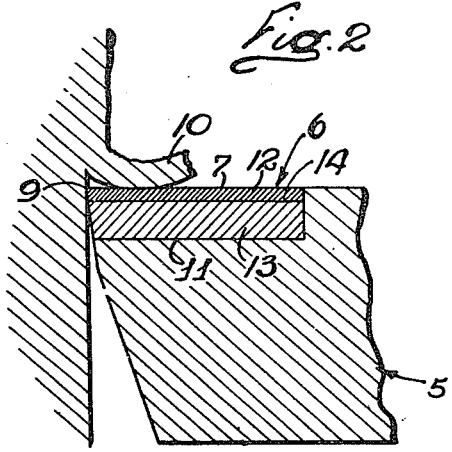
Fig. 2 is an enlarged fragmentary longitudinal sectional view illustrating the action of the tip in removing metal from a workpiece.

The cutting tool or tooth illustrated in the drawing comprises a body or shank 5 of any conventional shape usually composed of steel or cast iron. Mounted on one side of the shank and extending to the end thereof is a tip 6 which, in the case of the tooth shown, provides a generally flat cutting face 7 and is sharpened on the end and side to provide side and end cutting edges 8 and 9. The tip, which may be of substantially uniform thickness, is shown seated in a squared recess formed in the shank 5 and is firmly bonded at 11 to the seat by a suitable metallic bonding material which is capable of withstanding the maximum temperature attained at the bond in the service use of the tool. Silver solder is an example of a suitable bonding metal.

In metal cutting with such a tooth, a layer 10 of metal is removed from the work by the cutting edge 9 and the face 7, the chips flowing along the face 7 so that the highest temperature is attained on this face adjacent the cutting edge. This temperature decreases progressively down through the tip and into the supporting material or shank 5. The tip is made of a thickness which will insure an overall temperature drop through the tip sufficient to prevent deterioration of the bond 11 or the supporting material 5 under the severest conditions of use.

In accordance with the present invention, the tip is divided along a line generally parallel to the cutting face 7 and comprises a relatively thin layer 12 of a sintered carbide forming the cutting face 7 and the cutting edges 8 and 9 and a thicker under layer 13 of a material also possessing red hardness and constituting a support for the carbide layer 12. The supporting material is selected from the group of the cast nonferrous alloys mentioned above so as to facilitate grinding of the tip. In the tool shown, each layer is of uniform thickness, and the two are firmly bonded together at 14 as by high temperature brazing with copper or the like as is common in practice.

Figure 3:
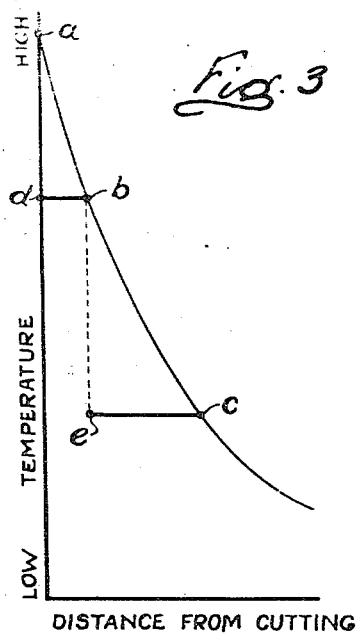
Fig. 3 shows a temperature gradient curve.

In order to obtain best grinding characteristics, it is desirable to make the carbide layer as thin as possible. On the other hand, the carbide must be thick enough to prevent the attainment in severest service use of a detrimental temperature at the bond 14 or in the cast metal of the supporting layer 13. Fig. 3 shows diagrammatically the temperature gradient curve for metallic material such as tungsten carbide, $a$ being the maximum safe operating temperature for metal cutting, points $b$ and $c$ being respectively the safe maximum temperatures for the Stellite used in the layer 13 and the steel used in the shank 5. Accordingly, the minimum thickness of the carbide layer 12 is represented by the line $db$ and, similarly, the Stellite layer 13 should be made of a thickness at least equal to the length of the line $ec$. Satisfactory results have been obtained with the layer 13 about two and one-half times as thick as the layer 12. The bonds 11 and 14 should, of course, be capable of withstanding the temperatures developed at the junctions of the layers 12 and 13, and 13 and 5, the examples of bonding materials mentioned above being satisfactory for this purpose.

It will be apparent from the foregoing that the overall thickness of the tip material is determined by the temperature that is permissible at the bond 11 so that substantially the same thickness is required whether the tip is carbide material alone or a composite tip as described above. Owing, however, to the thinness of the carbide layer 12 and the fact that the layer 13 may be ground much more readily, sharpening of the tool is greatly facilitated. There is less of the harder carbide material to remove, and, therefore, less frictional heat is developed, with a consequent reduction in the danger of damaging the tip by cracking or checking. For the same reason, more stock may be removed during each pass with the grinding wheel thereby speeding up the sharpening process. Furthermore, wearing off of the grinding wheel is less rapid so that the wheel will retain its size during the grinding of a larger number of cutter teeth. The attainment of precision in the sharpening of multiple tooth cutters is thereby facilitated.

As used in the appended claims, the term "inherent red hardness" contemplates sintered metallic carbides such as Carboloy, Firthite, Kennametal, Rexite, etc. and cast nonferrous metal alloys such as Stellite, Rexalloy, Tantung, Crobalt, etc., which materials acquire their hardness without heat treatment and retain ample hardness for metal cutting at temperatures in excess of 1500 degrees Fahrenheit. High speed steel may be annealed by heat treatment and, therefore, does possess inherent hardness.

I claim as my invention:

1. A cutting tool comprising a supporting body of ferrous material forming a seat for a tip, and a tip carried by said body on said seat and defining a cutting face, said tip comprising a relatively thin outer layer of a sintered metallic carbide forming said cutting face and an under layer of a cast nonferrous alloy bonded on one side to said carbide layer and on the other side to said seat, the materials of both layers possessing inherent red hardness and the red hardness of said carbide layer being greater than that of the second layer.

2. A tip for mounting on a tooth of a cutting tool comprising a relatively thin layer of a sintered carbide of uniform thickness and a substantially thicker layer of uniform thickness of a cast nonferrous alloy bonded to said carbide layer, the materials of both layers possessing inherent red hardness, and the red hardness of said carbide layer being greater than that of said second layer.

3. A tip for mounting on the tooth of a cutting tool comprising a relatively thin layer of a sintered carbide and a substantially thicker layer of a cast nonferrous alloy bonded to said carbide layer, the materials of both layers possessing inherent red hardness, and the red hardness of said carbide layer being greater than that of said second layer.

CHARLES E. KRAUS.